F. H. BOGART.
BODY YOKE.
APPLICATION FILED MAR. 24, 1910.
990,627.
Patented Apr. 25, 1911.
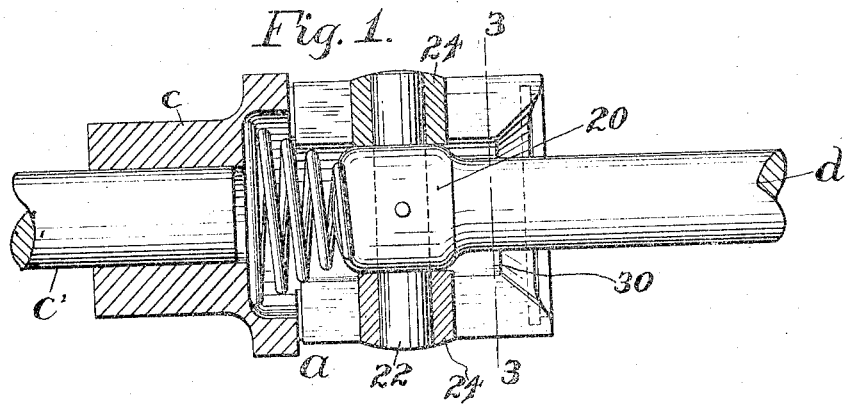
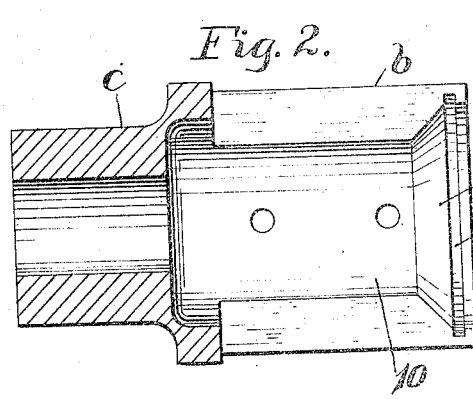
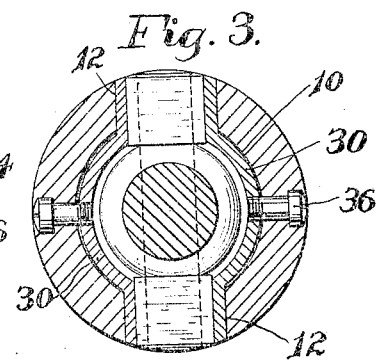
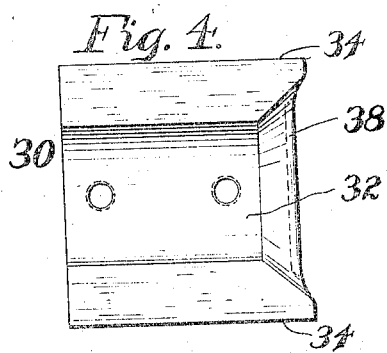
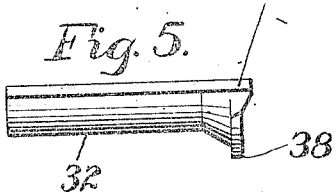
WITNESSES:
INVENTOR.
Fred H. Bogart.
BY M. E. Hart
his ATTORNEY.

UNITED STATES PATENT OFFICE.

FRED H. BOGART, OF HARTFORD, CONNECTICUT.

BODY-YOKE.

990,627.

Specification of Letters Patent. Patented Apr. 25, 1911.

Application filed March 24, 1910. Serial No. 551,332.

*To all whom it may concern:*

Be it known that I, FRED H. BOGART, a citizen of the United States, and a resident of Hartford, in the county of Hartford and State of Connecticut, have invented certain new and useful Improvements in Body-Yokes, of which the following is a specification.

The herein described device relates particularly to what is called the body yoke of a universal joint utilized in driving connections such as are employed in automobile construction.

The object of the invention is to improve the construction and decrease the cost of production of a device of this character.

In the drawings—Figure 1 is a central longitudinal section of a body yoke member of a universal joint made in accordance with my invention showing the complete joint assembled. Fig. 2 is a central longitudinal section of the yoke member. Fig. 3 is a transverse section on the line 3, 3 of Fig. 1. Fig. 4 is a detail plan view of one of the bearing plates. Fig. 5 is an edge view of the same.

Referring to the drawings the body yoke as a whole is indicated at $a$; $b$ is the yoke and $c$ the hub bored to receive a shaft $c'$. The yoke is recessed as at 10 giving it a tubular form, and transversely slotted as at 12 for the greater part of its length; the inner wall at the end of the yoke is beveled as at 14 and has a circumferential groove 16. The body yoke as so far described is made of comparatively soft steel which can be easily machined.

The propeller shaft is indicated at $d$ and has at its end a ball 20 through which a stud 22 passes transversely carrying at its end trunnion blocks 24—24 located in the slots 12 in the walls of the yoke the trunnions being free to turn on the stud. These trunnions are of hardened metal and heretofore have had their bearing directly on the walls of the slots 12 which necessitated hardening the entire yoke and then re-finishing and grinding to correct any distortion which occurred in the hardening process.

Broadly considered my invention contemplates widening the slots 12—12 and facing them with strips of hardened metal suitably secured in place to form a bearing surface for the trunnion blocks. In the preferred construction I use plates 30 formed up out of sheet metal with a curved central portion 32 and flat lateral faces 34—34. These lateral faces normally are oppositely inclined to a slight extent and only their outer edges bear on the walls of the slots. A slight clearance is left between the curved part of the plate and the inner wall of the yoke. Screws 36 having a bearing in the wall of the yoke are threaded into the curved parts of the plates and provide means whereby the plates may be drawn down to seat these lateral faces firmly against the walls of the slots.

In the ordinary use of a structure of this character, and particularly when the bearing plates are formed separately from the yoke, there is a shucking or moving of the bearing plates lengthwise of the yoke, which for practical purposes would be decidedly objectionable. In order to obviate this difficulty I form flanges 38 on the ends of the bearing plates 30, which are adapted to lie in the grooves 16 formed circumferentially about the inner surface of the yoke. These flanges in engagement with these grooves constitute an independent means for preventing any lengthwise movement between the plates and the yoke. It will thus be seen that after the joint is assembled complete there is no possibility of the plates shifting out of position, even though the securing screws 36 should be removed or become accidentally displaced.

There is thus provided a body-yoke structure having the required hardened bearing surfaces and one which can be manufactured at a great saving and one in which worn or broken parts can be readily replaced.

I claim:

1. A body yoke member of a universal joint formed of comparatively soft metal, the yoke end being recessed and having diametrically opposite slots and a circumferential groove, and facing plates of hardened metal for the walls of said slots and forming the bearing surfaces thereof, and having projections therefrom adapted to enter said groove.

2. A body yoke member of a universal joint formed of comparatively soft metal the yoke end being recessed and having diametrically opposite slots, and a pair of plates of hardened metal arranged opposite one another within said yoke and having lateral faces adapted to overlie and have bearing on the walls of said slots said plates and said yoke having interengaging parts.

3. A body yoke member of a universal joint formed of comparatively soft metal, the yoke being recessed and having diametrically opposite slots, and a pair of plates formed to shape from sheet metal and hardened, said plates being arranged opposite one another within said yoke and having lateral faces adapted to overlie and have a bearing on the walls of said slots said plates and said yoke having interengaging parts.

4. A body yoke member of a universal joint formed of comparatively soft metal, the yoke end being recessed and having diametrically opposite slots, a pair of plates shaped to fit within the recessed end of said yoke and arranged opposite one another, and having lateral faces extending from the edges of said plates and adapted to overlie and have bearing on the walls of the slots, there being a groove formed in the inner walls of the yoke and flanges on said plates adapted to lie in said groove.

5. A body yoke member of a universal joint formed of comparatively soft metal, the yoke end being recessed and having diametrically opposite slots, plates located within said yoke and arranged opposite to one another, and having lateral faces projecting from the edges of said plates and adapted to overlie the walls of said slots and normally having a bearing thereon only along their outer edges, means for drawing said plates into position to cause said lateral faces to bear evenly on the walls of the slots and means for preventing any lengthwise movement of the plates in the yoke.

FRED H. BOGART.

Witnesses:
GERTRUDE B. LYNCH,
D. I. KREIMENDAHL.